(12) United States Patent
Hoshino et al.

(10) Patent No.: US 9,032,913 B2
(45) Date of Patent: May 19, 2015

(54) INTERNAL COMBUSTION ENGINE SYSTEM

(75) Inventors: Maki Hoshino, Kawasaki (JP); Takao Izumi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 43 days.

(21) Appl. No.: 14/000,785

(22) PCT Filed: Dec. 1, 2011

(86) PCT No.: PCT/JP2011/077836
§ 371 (c)(1),
(2), (4) Date: Aug. 21, 2013

(87) PCT Pub. No.: WO2012/120737
PCT Pub. Date: Sep. 13, 2012

(65) Prior Publication Data
US 2013/0333639 A1   Dec. 19, 2013

(30) Foreign Application Priority Data

Mar. 9, 2011   (JP) ................................ 2011-051826

(51) Int. Cl.
*F02B 43/08*      (2006.01)
*F02M 27/02*      (2006.01)
(Continued)

(52) U.S. Cl.
CPC ........... *F02M 27/02* (2013.01); *F02M 25/0742* (2013.01); *B01J 23/96* (2013.01); *B01J 38/12* (2013.01); *F02D 41/042* (2013.01); *F02D 2200/0802* (2013.01); *F02M 25/074* (2013.01); *C01B 3/384* (2013.01); *C01B 2203/1064* (2013.01); *C01B 2203/1619* (2013.01); *C01B 2203/0233* (2013.01); CPC .. *C01B 2203/0238* (2013.01); *F02D 41/027* (2013.01); *F02D 41/0055* (2013.01)

(58) Field of Classification Search
CPC ........... F02D 2041/224; F02D 41/027; F02D 41/0055; F02M 25/074; F02M 25/0742; C01B 2203/0238
USPC ........................... 123/568.11–568.32, 532, 3
See application file for complete search history.

(56) References Cited

U.S. PATENT DOCUMENTS

| 2,655,786 | A | * | 10/1953 | Carr ................................ 60/206 |
| 8,486,166 | B2 | * | 7/2013 | Yahagi et al. ..................... 48/61 |
| 2011/0162629 | A1 | * | 7/2011 | Tan et al. ...................... 123/703 |
| 2014/0196702 | A1 | * | 7/2014 | Gingrich et al. ......... 123/568.21 |

FOREIGN PATENT DOCUMENTS

| JP | 60-114261 U | 8/1985 |
| JP | 61-035375 A | 2/1986 |

(Continued)

*Primary Examiner* — Hung Q Nguyen
*Assistant Examiner* — James Kim
(74) *Attorney, Agent, or Firm* — Global IP Counselors, LLP

(57) ABSTRACT

An internal combustion engine system basically has an internal combustion engine, a reforming fuel injection device and a reformer. The internal combustion engine has an exhaust circulation path that is connected to an exhaust path and an intake path communicating with a combustion chamber. The reforming fuel injection device injects a reforming fuel into an exhaust gas flowing through the exhaust circulation path. The reformer has a reforming catalyst for generating a hydrogen-containing gas using the reforming fuel. The internal combustion engine system has a reforming catalyst regeneration device for causing an oxygen-containing gas to flow through the exhaust circulation path and thereby regenerate the reforming catalyst at a predetermined timing for regenerating the reforming catalyst.

17 Claims, 11 Drawing Sheets

(51) Int. Cl.
B01J 23/96 (2006.01)
B01J 38/12 (2006.01)
F02D 41/04 (2006.01)
C01B 3/38 (2006.01)
F02M 25/07 (2006.01)
F02D 41/02 (2006.01)
F02D 41/00 (2006.01)

(56) References Cited

FOREIGN PATENT DOCUMENTS

| | | |
|---|---|---|
| JP | 2004-092520 A | 3/2004 |
| JP | 2004-150416 A | 5/2004 |
| JP | 4013704 B | 9/2007 |
| JP | 2007-309302 A | 11/2007 |

* cited by examiner

INTERNAL COMBUSTION ENGINE SYSTEM

CROSS-REFERENCE TO RELATED APPLICATIONS

This application is a U.S. National stage application of International Application No. PCT/JP2012/051760, filed Jan. 27, 2012, which claims priority claims priority under to Japanese Patent Application No. 2011-16796, filed in Japan on Jan. 28, 2011.

BACKGROUND

1. Field of the Invention

The present invention relates to an internal combustion engine system comprising a reformer provided with a reforming catalyst for recirculating a part of the exhaust gas to an exhaust circulation path communicating with an intake path and an exhaust path communicating with the combustion chamber of an internal combustion engine, and generating a hydrogen-containing gas using a reforming fuel supplied into the exhaust gas.

2. Background Information

Conventionally, there have been known exhaust circulation systems for recirculating and mixing a part of the exhaust gas discharged from an internal combustion engine into the intake system, and thereby lowering the maximum temperature during combustion and reducing the amount of NOx in the exhaust gas.

There have been proposed, as an application of the exhaust circulation system, internal combustion engine exhaust gas recirculation (EGR) reforming systems for supplying a fuel to the recirculated exhaust gas, performing a reforming reaction (endothermic reaction) on a reforming catalyst using the heat of the exhaust gas, and recirculating a gas containing hydrogen and carbon monoxide into the intake system, whereby the exhaust heat is recovered and fuel economy is improved (e.g., Japanese Laid-Open Patent Publication No. 61-35375).

There have also been proposed internal combustion engine EGR reforming systems in which degradation of the reforming catalyst is detected, whereby a deterioration in fuel economy and fluctuations in the torque are prevented (e.g., Japanese Patent No. 4013704). Possible reforming reactions include a water vapor reforming reaction in which water vapor in the exhaust gas is used, and dry reforming in which carbon dioxide is used; however, both reactions are prone to carbon deposition.

While the reforming reaction is performed by supplying fuel into the exhaust gas, depending on the fuel supply method, there is a possibility of the fuel not mixing with the exhaust gas component in a uniform manner and of a localized region having a low S/C or $CO_2/C$ ratio being generated. Under a condition of low S/C or $CO_2/C$ ratio, carbon deposition is more likely.

When carbon deposition occurs, the reforming catalyst eventually ceases to function, and it no longer becomes possible to obtain the desired hydrogen-containing gas. There are instances in which the performance of the reforming catalyst, having been reduced by carbon deposition, is restored through burn-off by an oxidation reaction using an oxygen-containing gas. However, since the combustion temperature increases in correspondence with the amount of carbon deposition, the temperature will rapidly increase if a large amount of carbon has been deposited. A rapid increase in temperature may lead to thermal degradation of the catalyst. The principal thermal degradation in such an instance is sintering of the catalyst particles, and much of the thermal degradation is permanent degradation from which regeneration is difficult.

In addition, with regards to the performance decrease, degradation, and abnormalities in the reforming catalyst, a variety of detection methods such as using the reforming catalyst temperature, hydrogen concentration, and carbon monoxide concentration have been proposed. On the reforming catalyst, a hydrogen-containing gas continues to be generated while carbon deposition is in progress.

SUMMARY

In the detection methods mentioned above, if a performance decrease or degradation of the reforming catalyst has been detected, a considerable amount of carbon deposition may be present. In such an instance, there is a risk that even though a performance decrease or degradation has been detected, thermal detection will occur during regeneration, and the performance of the reforming catalyst will be reduced even further.

Accordingly, the purpose of the present invention is to provide an internal combustion engine system in which the lifespan of the reforming catalyst can be extended without having to detect a performance decrease/degradation of the reforming catalyst.

The present invention for resolving the above-mentioned problem is an internal combustion engine system comprising: an internal combustion engine in which an exhaust circulation path is connected to an exhaust path and an intake path communicating with a combustion chamber; a reforming fuel injection device for injecting a reforming fuel into an exhaust gas flowing through the exhaust circulation path; and a reformer provided with a reforming catalyst for generating a hydrogen-containing gas using the reforming fuel; wherein the internal combustion engine system is characterized in being provided with a reforming catalyst regeneration means for causing an oxygen-containing gas to flow through the exhaust circulation path and thereby regenerate the reforming catalyst every predetermined timing for regenerating the reforming catalyst.

The present invention makes it possible to extend the lifespan of the reforming catalyst without having to detect the performance decrease/degradation of the reforming catalyst.

DETAILED DESCRIPTION OF THE EMBODIMENTS

Figure 1:
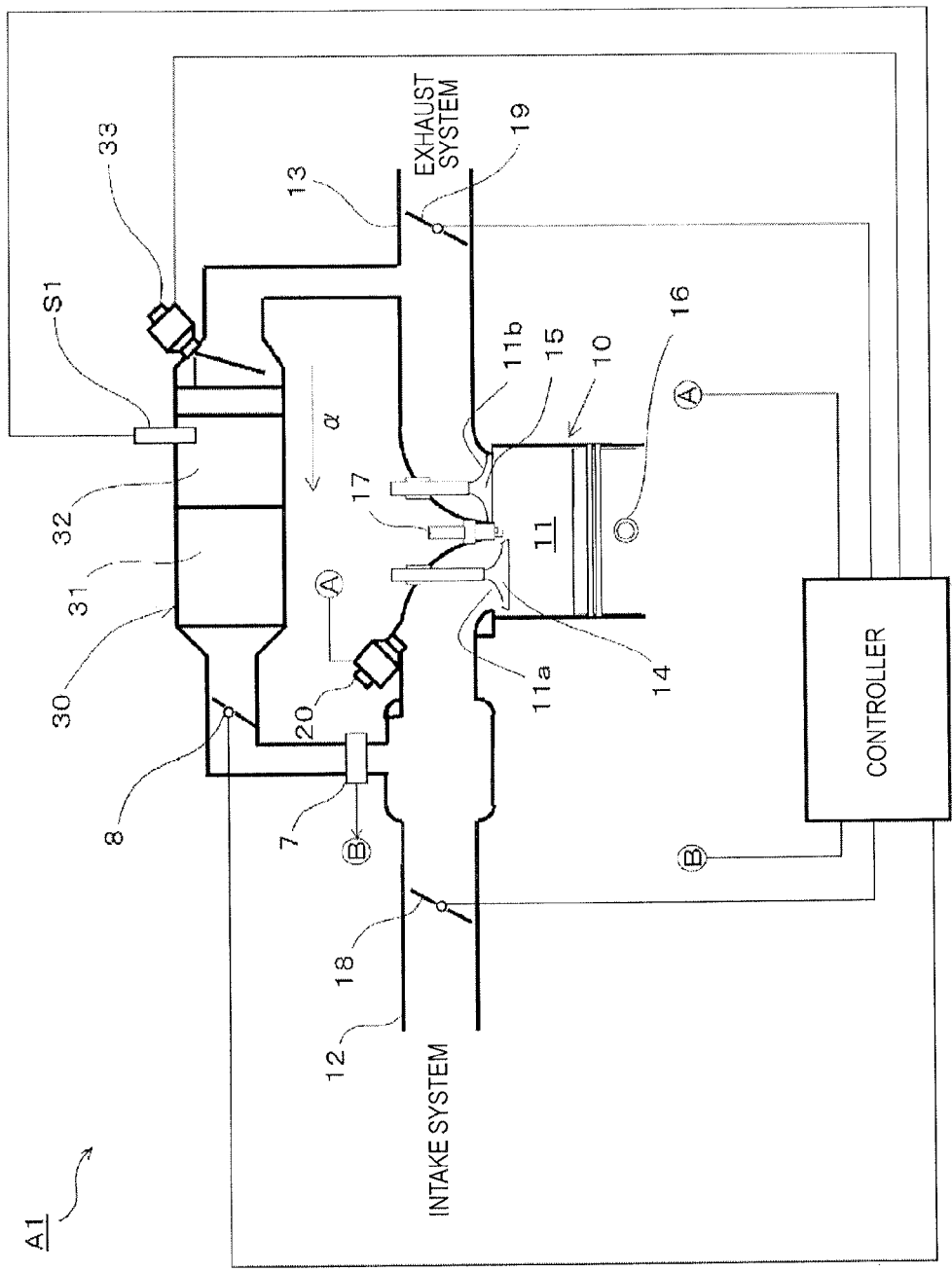
FIG. 1 illustrates the configuration of an internal combustion engine system according to a first embodiment of the present invention.

Embodiments of the present invention will now be described with reference to the accompanying drawings. FIG. 1 illustrates the configuration of an internal combustion engine system according to a first embodiment of the present invention. The internal combustion engine system A1 according to the first embodiment of the present invention is configured so as to have: a 4-cycle engine 10, which is an internal combustion engine; an intake path (hereafter referred to as "intake pipe") 12 connected to an intake port 11a of a combustion chamber 11; an exhaust path (hereafter referred to as "exhaust pipe") 13 connected to an exhaust port 11b of the combustion chamber 11; an exhaust circulation path (hereafter referred to as "exhaust gas recirculation (EGR) pipe") pipe 30 connected between the intake pipe 12 and the exhaust pipe 13; and a controller C, which represents the control core of the system.

The intake pipe 12 has: a main fuel supply device 20 provided to the vicinity of the intake port 11a thereof; and an intake control valve 18, which is for controlling the amount of air travelling to the combustion chamber 11, provided further upstream from the main fuel supply device 20 with regards to the direction of intake.

The main fuel supply device 20 has a function of injecting the main fuel into the combustion chamber 11 or the intake pipe 12, and is connected to the output side of the controller C and configured to be driven as appropriate. An exhaust control valve 19 for regulating the flow rate of the exhaust gas is provided to the exhaust pipe 13. Numeral 16 represents a piston and numeral 17 represents a spark plug.

The EGR pipe 30 is for diverting, i.e., recirculating, a part of the exhaust gas discharged from the exhaust pipe 13 into the intake pipe 12. The EGR pipe 30 has a reforming fuel injection device 33, a reformer 32, an EGR cooler 31 for cooling the exhaust gas, an EGR valve 8 for adjusting the flow rate of the exhaust gas, and a pipe open/close valve 7 provided in sequence from the upstream side to the downstream side with regards to the flow direction a of the exhaust gas. The EGR valve 8 and the pipe open/close valve 7 are connected to the output side of the controller C and configured to be driven as appropriate.

The reforming fuel injection device 33 has a function of injecting the reforming fuel into the exhaust gas channeled towards the reformer 32, and is connected to the output side of the controller C and configured to be driven as appropriate.

The reformer 32 has provided within a reforming catalyst for generating a hydrogen-containing gas using the reforming fuel, and has a reformer catalyst temperature sensor S1 provided thereto. The reformer catalyst temperature sensor S1 is for detecting the temperature of the reforming catalyst of the reformer 32, and is connected to the input side of the controller C and configured so as to be capable of measuring the temperature of the reforming catalyst.

In other words, in the internal combustion engine system A1, a part of the exhaust gas, which has undergone stoichiometric combustion in the combustion chamber 11, is diverted from then exhaust pipe 13 to the EGR pipe 30, added with the reforming fuel, reformed on the reforming catalyst in the reformer 32 to obtain the hydrogen-containing gas, and recirculated to the intake pipe 12.

The controller C comprises a central processing unit (CPU), an interface circuit, and other elements, and executes required programs to achieve the following functions. The internal combustion engine system A1 causes the oxygen-containing gas to flow through the EGR pipe 30 and thereby regenerates the reforming catalyst every predetermined timing for regenerating the reforming catalyst. In the present embodiment, this is performed as follows.

(1) A function for determining whether or not the predetermined timing for regenerating the reforming catalyst has been reached. This function is referred to as the "regeneration timing determination means C1." In the present embodiment, the "predetermined timing for regeneration" is reached when the "reforming of the exhaust gas is discontinued," and it is determined whether or not the reforming of the exhaust gas has been discontinued. The time at which the "reforming of the exhaust gas is discontinued" corresponds to the time at which injection of the reforming fuel by the reforming fuel injection device 33 is discontinued.

At the time at which the reforming of the exhaust gas is discontinued, the reforming catalyst is likely to be at a temperature that is suitable for regeneration, since reforming has been performed until immediately prior to this time. In many instances, the oxygen-containing gas can be supplied upon discontinuation of the reforming of the exhaust gas. However, if the reforming catalyst temperature has reached 650° C. or above, supply of the oxygen-containing gas should not take place. If the oxygen-containing gas is supplied in a state of high reforming catalyst temperature, there is a possibility of the reforming catalyst experiencing thermal degradation due to a temperature increase accompanying combustion when the deposited carbon is removed by oxidation.

The "predetermined timing for regeneration" is not limited to the abovementioned "time at which the reforming of the exhaust gas is discontinued"; the timing may be when "the engine is about to be stopped." "The engine being about to be stopped" refers to a state in which the throttle (not shown) has returned. Normally, the piston rotates several cycles due to inertia. Lean combustion is performed in the combustion chamber 11 prior to the throttle returning, whereby lean combustion exhaust gas or air corresponding to several cycles is obtained after the throttle is returned. The reforming catalyst is regenerated using the lean combustion exhaust gas generated during this rotation.

(2) A function for starting supply of the oxygen-containing gas to the EGR pipe 30 when it is determined that the predetermined timing for regeneration has been reached. This function is referred to as the "oxygen-containing gas supply start means C2." Specifically, the exhaust control valve 19 is closed and the pipe open/close valve 7 is opened, whereby supply of the oxygen-containing gas is started.

(3) A function for causing the oxygen-containing gas to flow through the EGR pipe 30, whereby the reforming catalyst is regenerated. This function is referred to as the "reforming catalyst regeneration means C3." "Regeneration of the reforming catalyst" refers to causing the reforming catalyst to oxidize using the oxygen-containing gas. In the present embodiment, this is performed by causing the lean combustion gas discharged from the internal combustion engine 10 to flow through the EGR pipe 30 at the required temperature. The oxygen-containing gas need only contain oxygen necessary for removing carbon by combustion, and other than the lean combustion gas discharged from the combustion chamber 11, may also be air.

(4) A function for discontinuing the supply of the oxygen-containing gas to the EGR pipe 30. This function is referred to as the "oxygen-containing gas supply discontinuation means C4." The exhaust control valve 19 is opened, whereby supply of the oxygen-containing gas to the EGR pipe 30 is discontinued.

Figure 2:
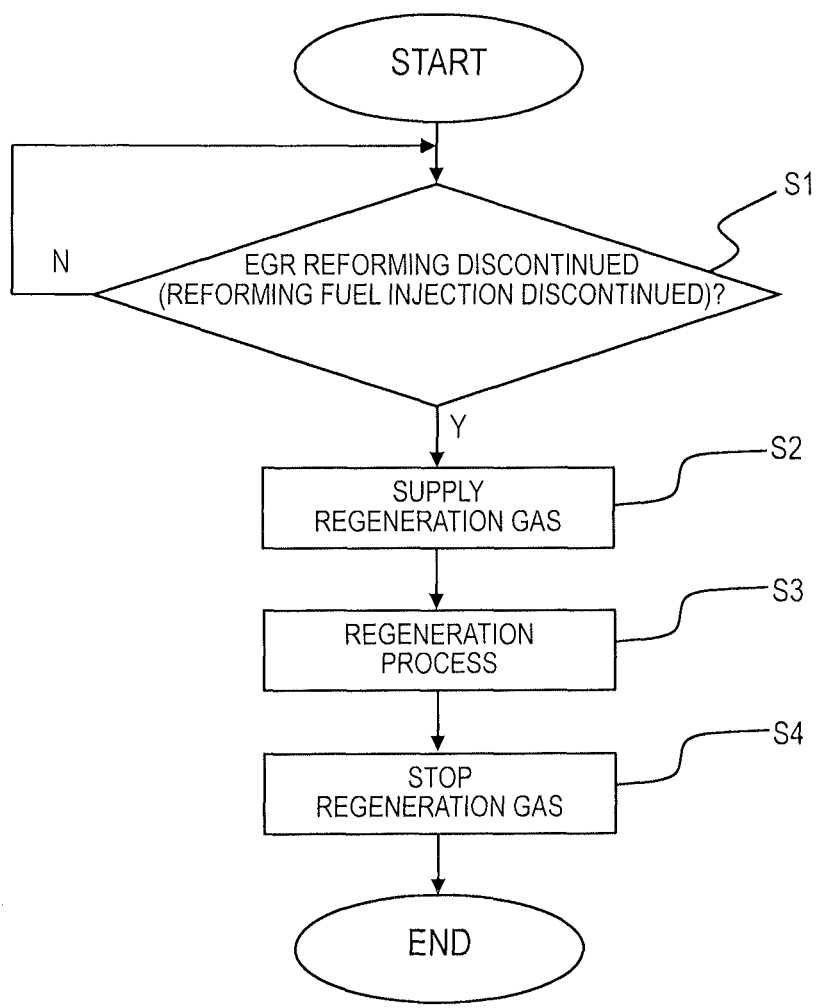
FIG. 2 is a flow chart showing the operation, according to a first example, of the internal combustion engine system.
Figure 3:
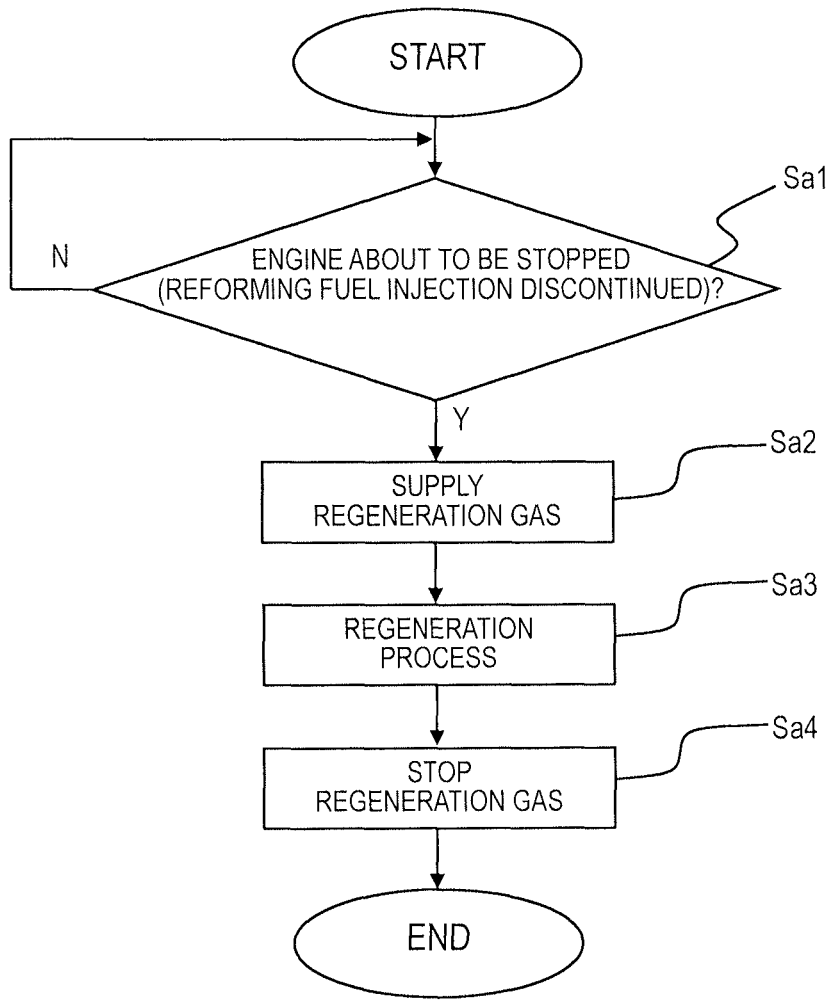
FIG. 3 is a flow chart showing the operation, according to a second example, of the internal combustion engine system.

The operation of the internal combustion engine system A1 configured as described above will now be described with reference to FIGS. 2 and 3. FIG. 2 is a flow chart showing the operation, according to a first example, of the internal combustion engine system A1, and FIG. 3 is a flow chart showing the operation, according to the first example, of the internal combustion engine system A1. In FIG. 2, step 1 is abbreviated to "S1," and in FIG. 3, step 1 is abbreviated to "Sa1"; other steps are expressed in a similar manner.

First, a description will be given for the operation according to the first example shown in FIG. 2. In FIGS. 2 and 3, and in FIG. 4 described further below, the "oxygen-containing gas" is expressed as the "regeneration gas." Step 1 (indicated by "S1" in FIG. 2; similar abbreviations apply below): it is determined whether or not the reforming of the exhaust gas has been discontinued. If it is determined that the reforming of the exhaust gas has been discontinued, the flow proceeds to step 2, and if not, step 1 is repeated. Step 2: the exhaust control valve 19 is closed and the flow of the exhaust gas through the EGR pipe 30 is started. Step 3: the exhaust gas is caused to flow through the EGR pipe 30 at the required temperature, whereby the reforming catalyst is subjected to a regeneration process. Step 4: the exhaust control valve 19 is opened, and the supply of the exhaust gas to the EGR pipe 30 is discontinued.

Next, a description will be given for the operation according to the second example shown in FIG. 3. Step 1 (indicated by "Sa1" in FIG. 3; similar abbreviations apply below): it is determined whether or not the engine is about to stop. If it is determined that the engine is about to stop, the flow proceeds to step 2, and if not, step 1 is repeated.

Step 2: the exhaust control valve 19 is closed and the flow of the exhaust gas through the EGR pipe 30 is started. Step 3: the exhaust gas is caused to flow through the EGR pipe 30 at the required temperature, whereby the reforming catalyst is subjected to a regeneration process. Step 4: the exhaust control valve 19 is opened, and the supply of the exhaust gas to the EGR pipe 30 is discontinued.

Specifically, in a hybrid engine system mounted with a battery (not shown), there are frequent occasions in which the engine is stopped for the sake of efficient operation, and the reforming catalyst can be regenerated at appropriate times. In addition, in a hybrid engine system mounted with a battery, when the engine is stopped, the oxygen-containing gas can be supplied to the reforming catalyst, without utilizing the abovementioned operation of the piston, by driving the piston using the motor.

Specifically, a function may be present in which the internal combustion engine 10 is actuated by a motor, whereby the oxygen-containing gas flows through the EGR pipe 30 and the reforming catalyst is thereby regenerated. An operation is also possible in which the determination process in step 1 (Sa1) shown in FIG. 3 is incorporated into the flow chart shown in FIG. 2.

Figure 4:
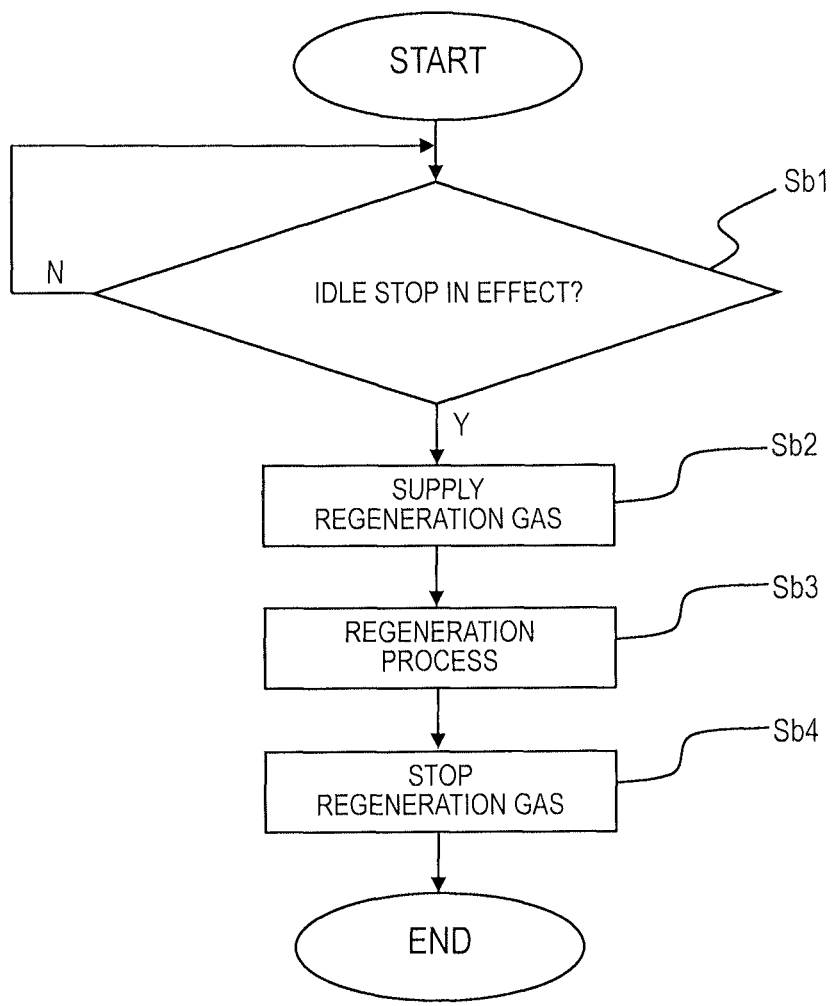
FIG. 4 is a flow chart showing the operation, according to a third example, of the internal combustion engine system.

FIG. 4 is a flow chart showing the operation, according to a third example, of the internal combustion engine system A1. In the present example, "the predetermined timing for regenerating the reforming catalyst" corresponds to idle stop being in effect. "Idle stop" refers to a state in which the vehicle body (not shown) is not in motion when the internal combustion engine 10 is operating. The regeneration timing determination means C1 determines whether or not idle stop is in effect.

Step 1 (indicated by "Sb1" in FIG. 4; similar abbreviations apply below): it is determined whether or not idle stop is in effect. If it is determined that idle stop is in effect, the flow proceeds to step 2, and if not, step 1 is repeated.

Step 2: the exhaust control valve 19 is closed and the flow of the exhaust gas through the EGR pipe 30 is started. Step 3: the exhaust gas is caused to flow through the EGR pipe 30 at the required temperature, whereby the reforming catalyst is subjected to a regeneration process. Step 4: the exhaust control valve 19 is opened, and the supply of the exhaust gas to the EGR pipe 30 is discontinued.

Specifically, during idle stop, the reforming catalyst temperature is expected to be relatively low, and regeneration can be performed without concern of thermal degradation from high temperatures. The flow chart shown in FIG. 4 may be incorporated into the flow charts shown in FIGS. 2 and 3. In other words, the determinations in steps S1, S1a, and S1b may be performed in sequence, and regeneration of the reforming catalyst performed with each determination.

Figure 5:
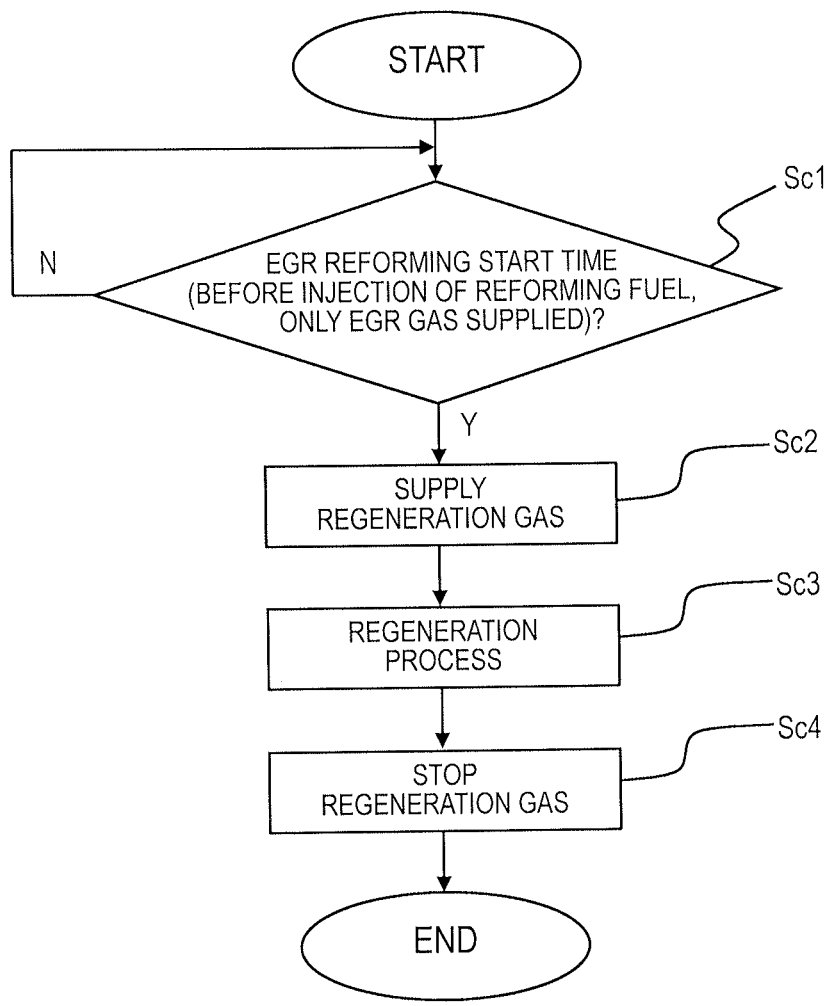
FIG. 5 is a flow chart showing the operation, according to a fourth example, of the internal combustion engine system.

FIG. 5 is a flow chart showing the operation, according to a fourth example, of the internal combustion engine system A1. In the present example, the "predetermined timing for regeneration" corresponds to the time at which the reforming of the recirculating exhaust gas using the reforming catalyst is to be started. In FIG. 5, this is expressed as "EGR reforming start time." Specifically, this refers to a state, prior to injection of the reforming fuel, in which only the exhaust gas is caused to flow. The regeneration timing determination means C1 determines whether or not this state is present.

Step 1: it is determined whether or not it is the EGR reforming start time. If it is determined that it is the EGR reforming start time, the flow proceeds to step 2, and if not, step 1 is repeated. Step 2: the exhaust control valve 19 is closed and the flow of the exhaust gas through the EGR pipe 30 is started. Step 3: the exhaust gas is caused to flow through the EGR pipe 30 at the required temperature, whereby the reforming catalyst is subjected to a regeneration process. Step 4: the exhaust control valve 19 is opened, and the supply of the exhaust gas to the EGR pipe 30 is discontinued.

Figure 6:
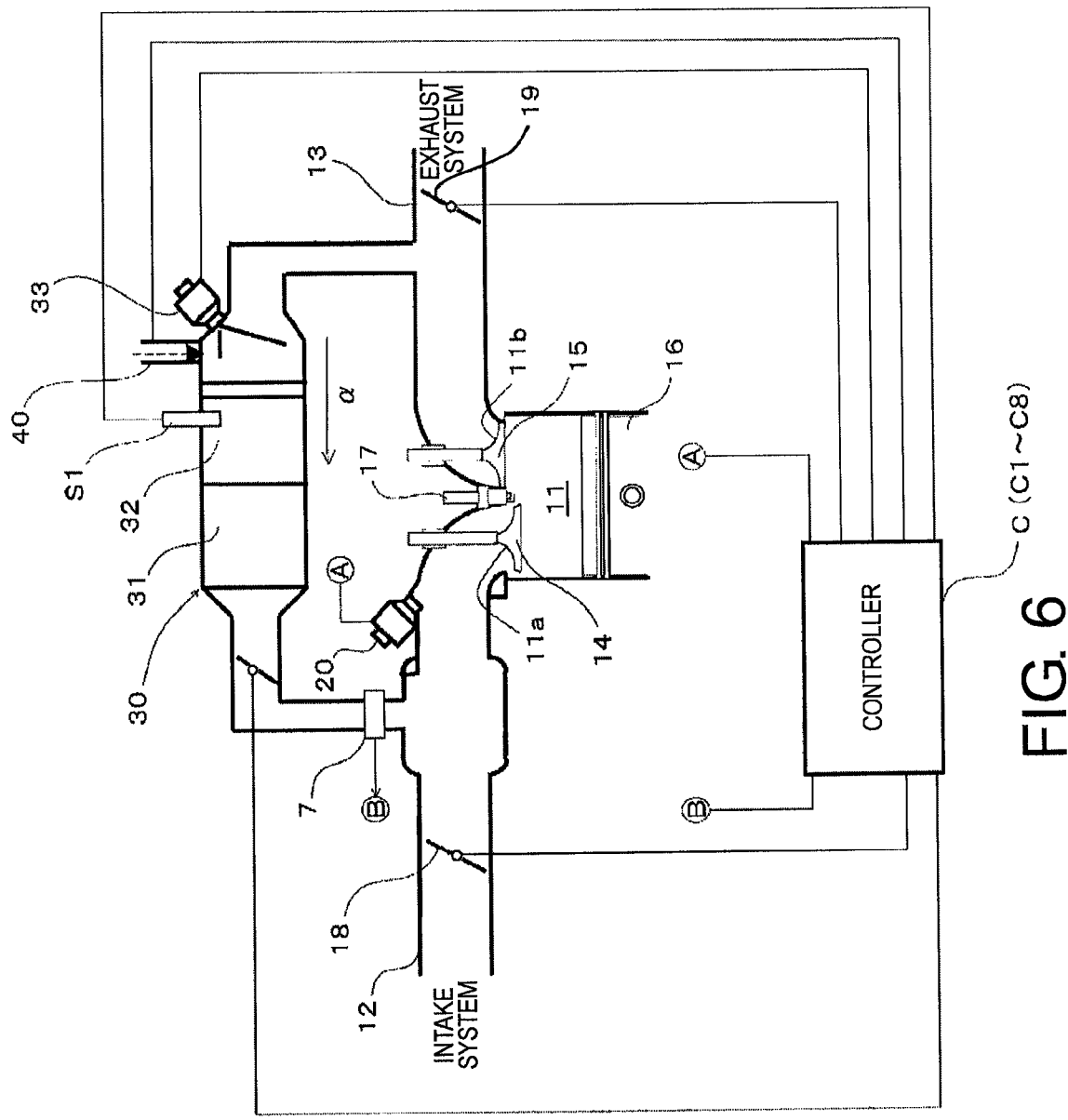
FIG. 6 is a block diagram showing the configuration of an internal combustion engine system according to a second embodiment of the present invention.

FIG. 6 is a block diagram showing the configuration of an internal combustion engine system A2 according to a second embodiment of the present invention. Elements that are equivalent to those described in the above embodiment will be affixed with the same numerals, and a description thereof shall not be provided.

The internal combustion engine system A2 according to the second embodiment of the present invention is configured so that in addition to the configuration of the above-mentioned internal combustion engine system A1, an oxygen-containing gas supply device 40 is provided to the EGR pipe 30. The oxygen-containing gas supply device 40 is arranged further upstream from the reformer 32 with regards to the flow direction a of the exhaust gas, connected to the output side of the controller C, and configured to be driven as appropriate.

(1) A function for determining whether or not the predetermined timing for regenerating the reforming catalyst has been reached. This function is referred to as the "regeneration timing determination means C1." In the present embodiment, the "predetermined timing for regeneration" is reached when the "EGR reforming is discontinued." Specifically, it is determined whether or not the injection of the reforming fuel has been discontinued.

(2) A function for determining whether or not the reforming catalyst provided to the reformer 32 has reached the required temperature. This function is referred to as the "reformer catalyst temperature determination means C5." The temperature of the reforming catalyst is detected using the reformer catalyst temperature sensor S1. In the present embodiment, it is determined whether or not the temperature has become equal to or less than 650° C. Oxidation reaction due to an oxygen-containing gas is an exothermic reaction; therefore, if a large quantity of carbon is deposited on the reforming catalyst and this carbon reacts all at once, there is a risk of the temperature being too high. If the temperature is too high, the reforming catalyst is more likely to thermally degrade; therefore, if the temperature is greater than 650° C., the oxygen-containing gas for regeneration should not be supplied. It is preferable that the oxygen-containing gas be supplied after the reforming catalyst temperature has reached the predetermined temperature.

(3) A function for determining whether or not the reforming catalyst is in the required temperature range. This function is referred to as the "reforming catalyst temperature range determination means C6." In the present embodiment, the "required temperature range" is defined as 300° C. to 600° C. (no less than 300° C. and no greater than 650° C.). Specifically, with regard to causing the deposited carbon to combust in an efficient manner, if the reforming catalyst temperature is too low, the oxidation reaction is hindered. Therefore, the temperature is preferably 300° C. to 600° C., and further preferably 450° C. to 600° C.

(4) A function for starting supply of the oxygen-containing gas to the EGR pipe 30. This function is referred to as the "oxygen-containing gas supply start means C2." Specifically, the exhaust control valve 19 is closed and the pipe open/close valve 7 is opened, whereby supply of the oxygen-containing gas is started.

(5) A function for causing the oxygen-containing gas to flow through the EGR pipe 30, whereby the reforming catalyst is regenerated. This function is referred to as the "reforming catalyst regeneration means C3." "Regeneration of the reforming catalyst" refers to causing the reforming catalyst to oxidize using the oxygen-containing gas. In the present embodiment, this is performed by causing the oxygen-containing gas to flow from the oxygen-containing gas supply device 40 through the EGR pipe 30 at the required temperature.

(6) A function for discontinuing the supply of the oxygen-containing gas to the EGR pipe 30. This function is referred to as the "oxygen-containing gas supply discontinuation means C4." The exhaust control valve 19 is opened, whereby supply of the oxygen-containing gas to the EGR pipe 30 is discontinued.

Figure 7:
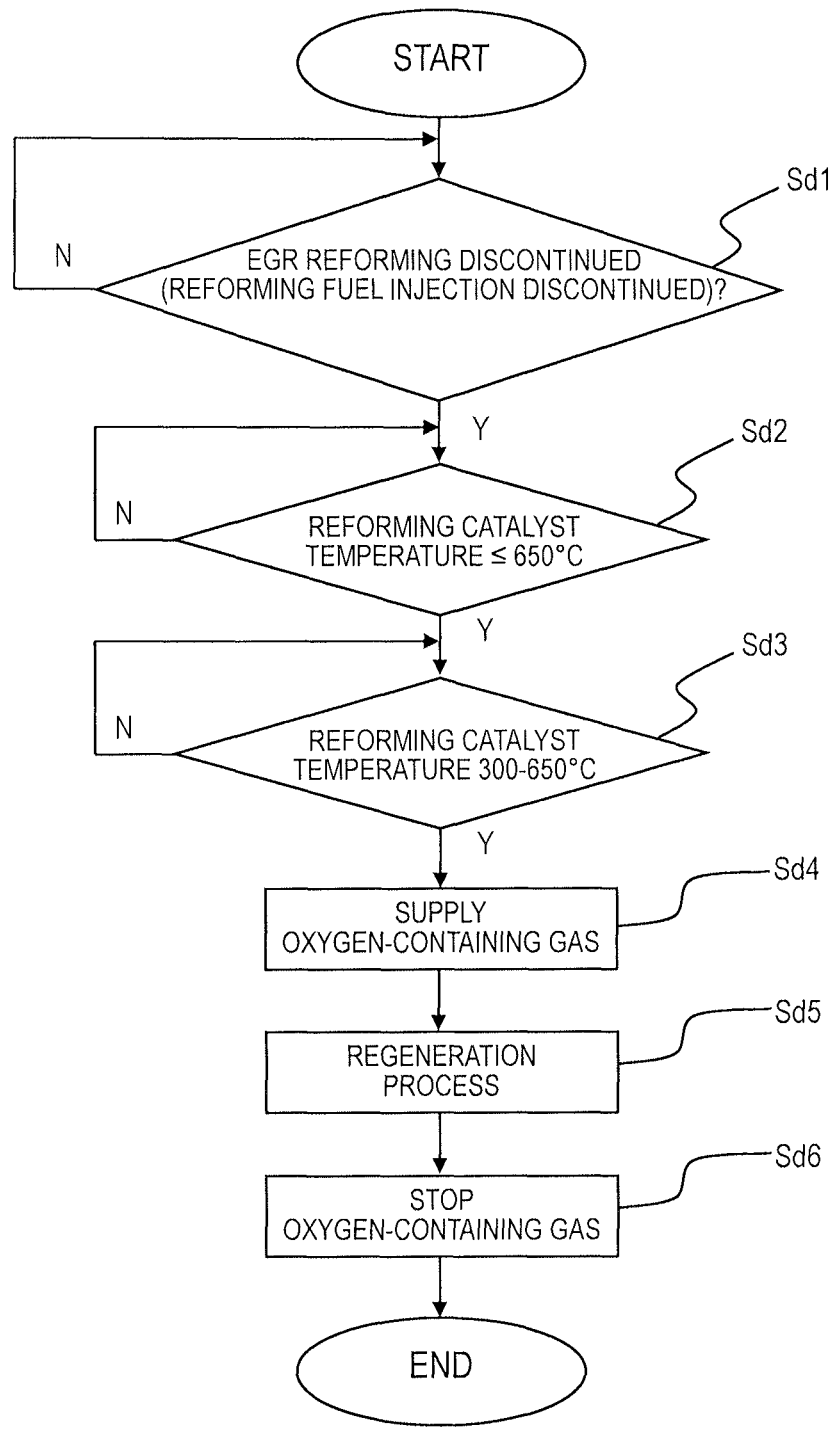
FIG. 7 is a flow chart showing the operation, according to a first example, of the internal combustion engine system according to the second embodiment.

FIG. 7 is a flow chart showing the operation, according to a first example, of the internal combustion engine system A2. In the present example, the "predetermined timing for regeneration" corresponds to when reforming of the reforming catalyst is discontinued. In FIG. 7, this is expressed as "EGR reforming discontinued." Specifically, this refers to when the injection of the reforming fuel is discontinued. The regeneration timing determination means C1 determines whether or not injection of the reforming fuel has been discontinued.

Step 1 (indicated by "Sd1" in FIG. 7; similar abbreviations apply below): it is determined whether or not the reforming of the reforming catalyst has been discontinued. If it is determined that the reforming of the reforming catalyst has been discontinued, the flow proceeds to step 2, and if not, step 1 is repeated. Step 2: it is determined whether or not the temperature of the reforming catalyst has become 650° C. or less. If it is determined that the temperature has become 650° C. or less, the flow proceeds to step 3, and if not, step 2 is repeated.

Step 3: it is determined whether or not the temperature of the reforming catalyst is in a temperature range of 300° C. to 650° C. (no less than 300° C. and no greater than 650° C.). If it is determined that the temperature is in this temperature range, the flow proceeds to step 4, and if not, step 3 is repeated.

Step 4: the exhaust control valve 19 is closed and the flow of the exhaust gas through the EGR pipe 30 is started. Step 5: the exhaust gas is caused to flow through the EGR pipe 30 at the required temperature, whereby the reforming catalyst is subjected to a regeneration process. Step 6: the exhaust control valve 19 is opened, and the supply of the exhaust gas to the EGR pipe 30 is discontinued.

Figure 8:
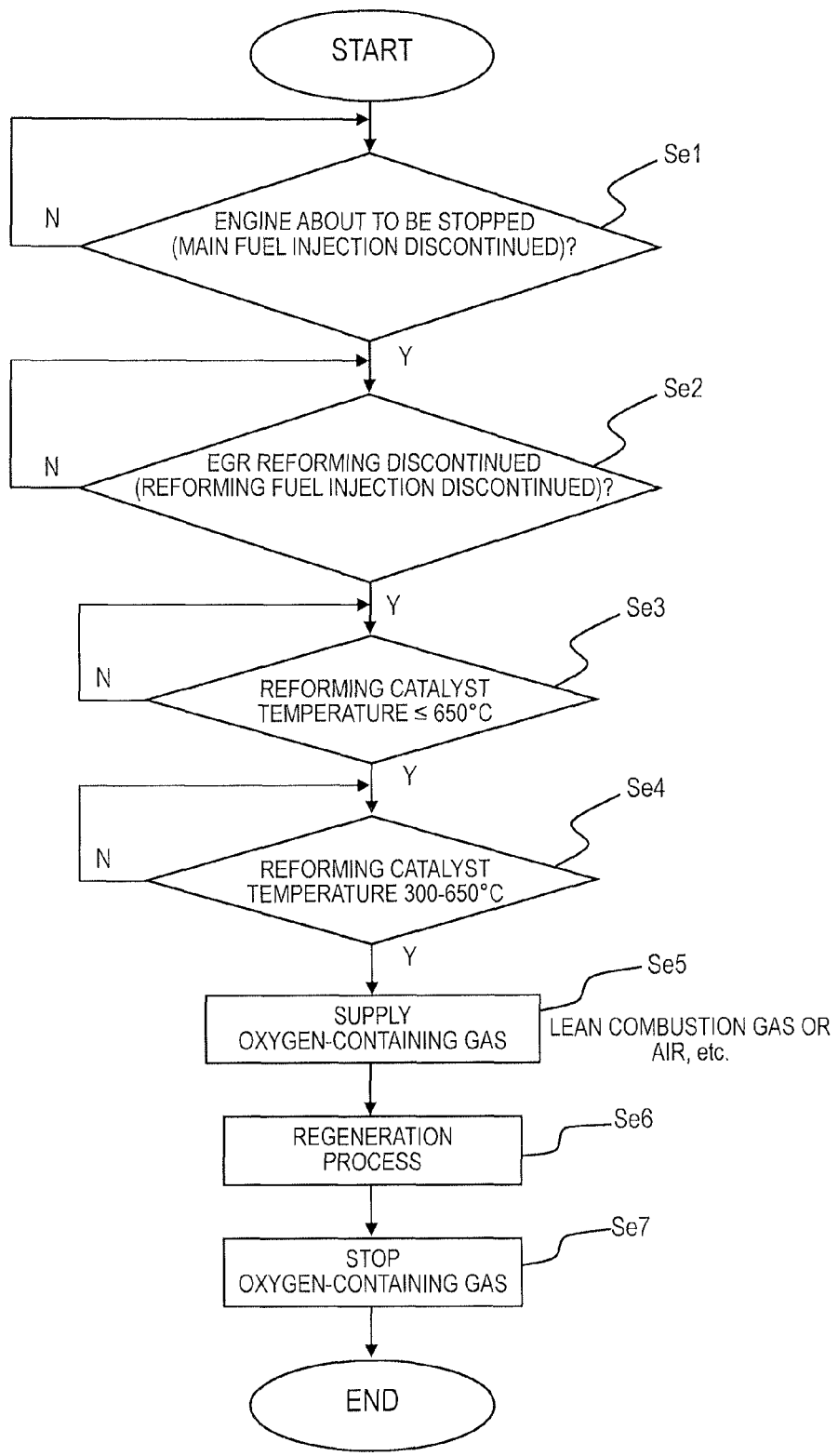
FIG. 8 is a flow chart showing the operation, according to a second example, of the internal combustion engine system according to the second embodiment.

FIG. 8 is a flow chart showing the operation, according to the second example, of the internal combustion engine system A2. Step 1 (indicated by "Se1" in FIG. 8; similar abbreviations apply below): it is determined whether or not the engine is about to stop. If it is determined that the engine is about to stop, the flow proceeds to step 2, and if not, step 1 is repeated. Step 2: it is determined whether or not the reforming of the exhaust gas has been discontinued. If it is determined that the reforming of the exhaust gas has been discontinued, the flow proceeds to step 3, and if not, step 2 is repeated.

Step 3: it is determined whether or not the temperature of the reforming catalyst is 650° C. or less. If it is determined that the temperature is 650° C. or less, the flow proceeds to step 4, and if not, step 3 is repeated.

Step 4: it is determined whether or not the temperature of the reforming catalyst is in a temperature range of 300° C. to 650° C. If it is determined that the temperature is in this temperature range, the flow proceeds to step 5, and if not, step 4 is repeated.

Step 5: the exhaust control valve 19 is closed and the flow of the exhaust gas through the EGR pipe 30 is started. Step 6: the exhaust gas is caused to flow through the EGR pipe 30 at the required temperature, whereby the reforming catalyst is subjected to a regeneration process. Step 7: the exhaust control valve 19 is opened, and the supply of the exhaust gas to the EGR pipe 30 is discontinued.

Figure 9:
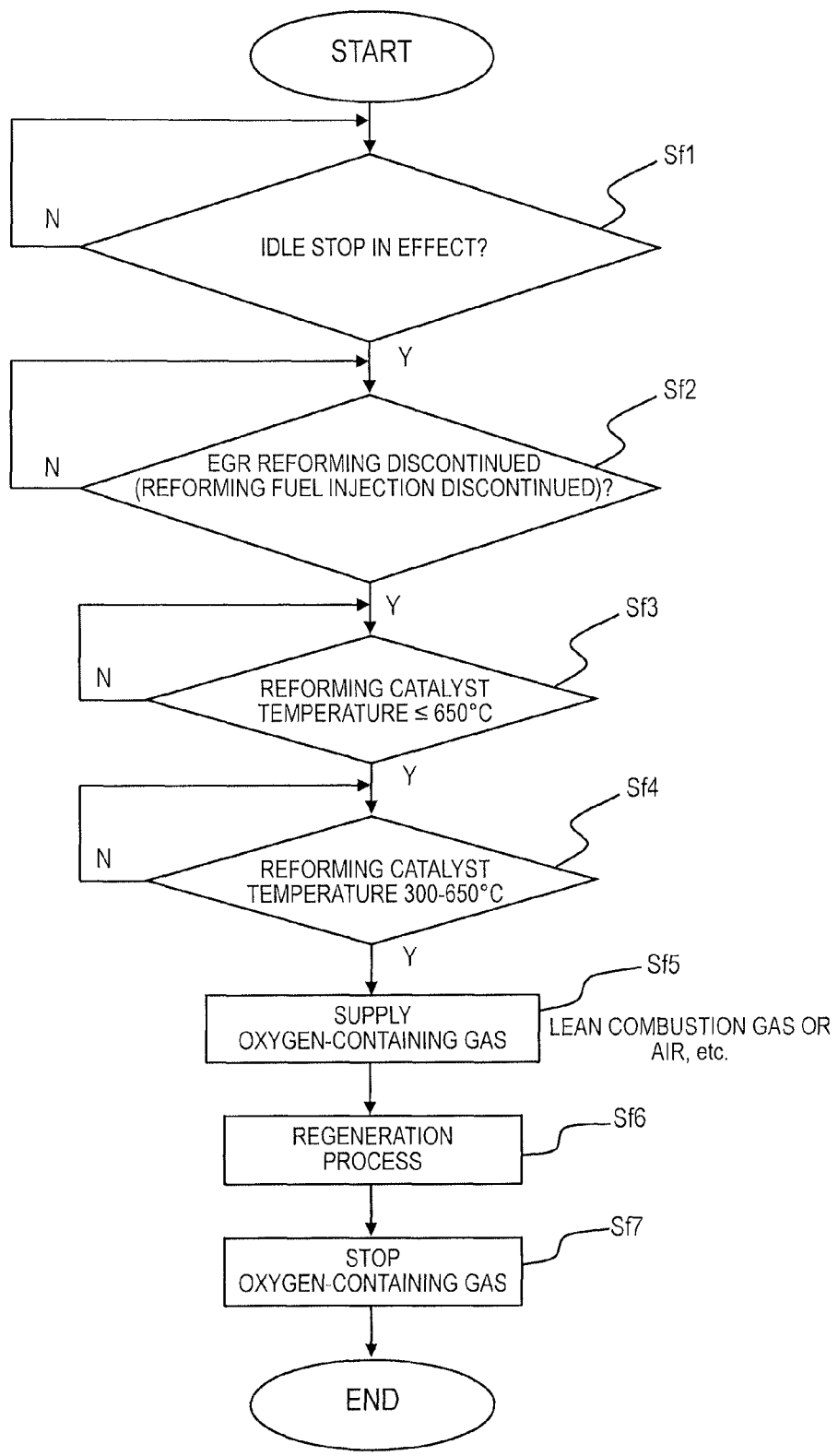
FIG. 9 is a flow chart showing the operation, according to a third example, of the internal combustion engine system according to the second embodiment.

FIG. 9 is a flow chart showing the operation, according to the third example, of the internal combustion engine system A2. Step 1: it is determined whether or not the idle-stop state is present. If it is determined that the idle-stop state is present, the flow proceeds to step 2, and if not, step 1 is repeated.

Step 2: it is determined whether or not the reforming of the exhaust gas has been discontinued. If it is determined that the reforming of the exhaust gas has been discontinued, the flow proceeds to step 3, and if not, step 2 is repeated.

Step 3: it is determined whether or not the temperature of the reforming catalyst is 650° C. or less. If it is determined that the temperature is 650° C. or less, the flow proceeds to step 4, and if not, step 3 is repeated.

Step 4: it is determined whether or not the temperature of the reforming catalyst is in a temperature range of 300° C. to 650° C. (no less than 300° C. and no greater than 650° C.). If it is determined that the temperature is in this temperature range, the flow proceeds to step 5, and if not, step 4 is repeated.

Step 5: the exhaust control valve 19 is closed and the flow of the exhaust gas through the EGR pipe 30 is started. Step 6: the exhaust gas is caused to flow through the EGR pipe 30 at the required temperature, whereby the reforming catalyst is subjected to a regeneration process. Step 7: the exhaust control valve 19 is opened, and the supply of the exhaust gas to the EGR pipe 30 is discontinued.

Figure 10:
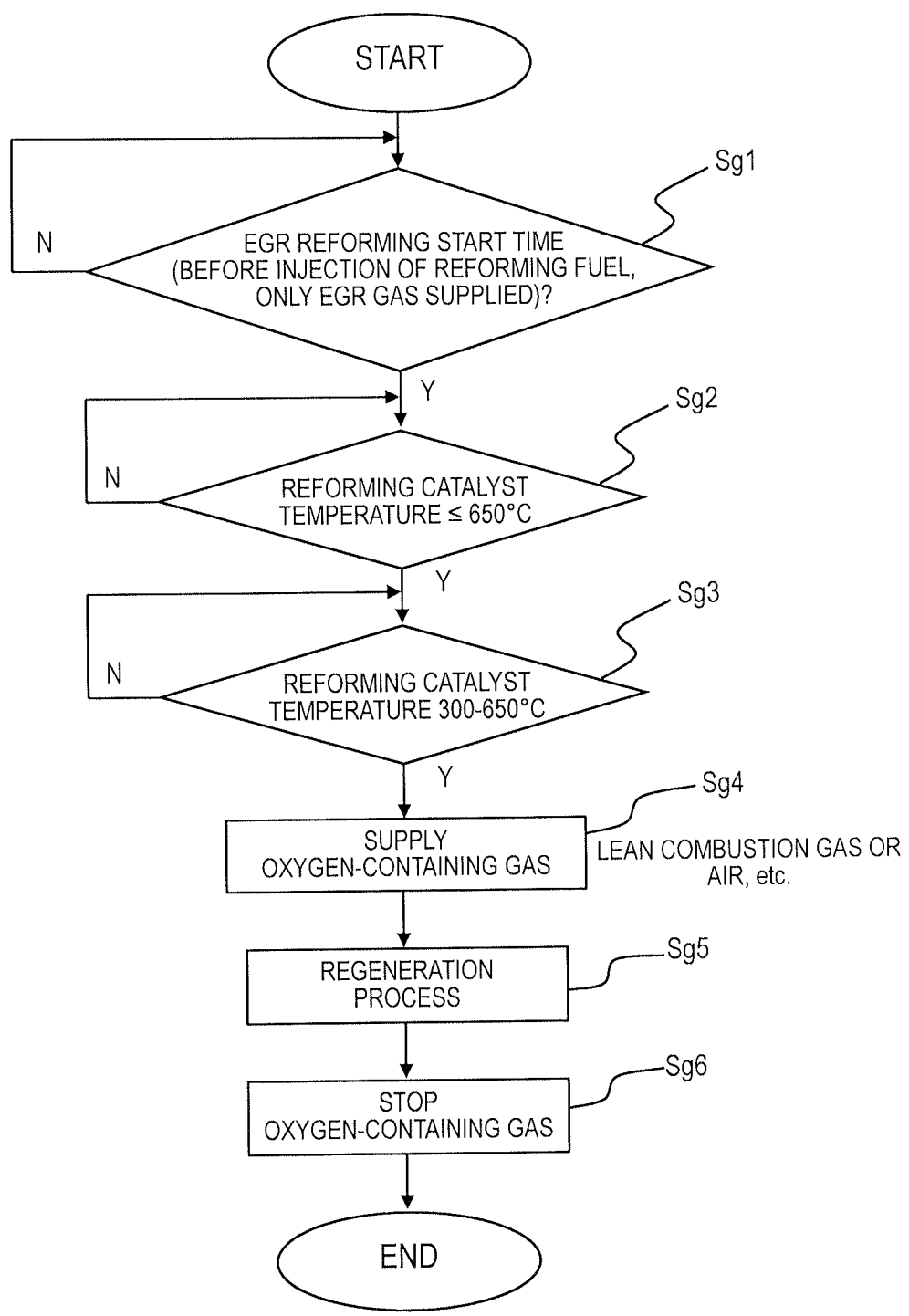
FIG. 10 is a flow chart showing the operation, according to a fourth example, of the internal combustion engine system according to the second embodiment.

FIG. 10 is a flow chart showing the operation, according to a fourth example, of the internal combustion engine system A2. Step 1 (indicated by "Sg1" in FIG. 10; similar abbreviations apply below): it is determined whether or not the reforming of the recirculating exhaust gas is to be started. If it is determined that the reforming of the exhaust gas is to be started, the flow proceeds to step 2, and if not, step 1 is repeated.

Step 2: it is determined whether or not the temperature of the reforming catalyst is 650° C. or less. If it is determined that the temperature is 650° C. or less, the flow proceeds to step 3, and if not, step 2 is repeated.

Step 3: it is determined whether or not the temperature of the reforming catalyst is in a temperature range of 300° C. to 650° C. (no less than 300° C. and no greater than 650° C.). If it is determined that the temperature is in this temperature range, the flow proceeds to step 4, and if not, step 3 is repeated.

Step 4: the exhaust control valve 19 is closed and the flow of the exhaust gas through the EGR pipe 30 is started. Step 5: the exhaust gas is caused to flow through the EGR pipe 30 at the required temperature, whereby the reforming catalyst is subjected to a regeneration process. Step 6: the exhaust control valve 19 is opened, and the supply of the exhaust gas to the EGR pipe 30 is discontinued.

Figure 11:
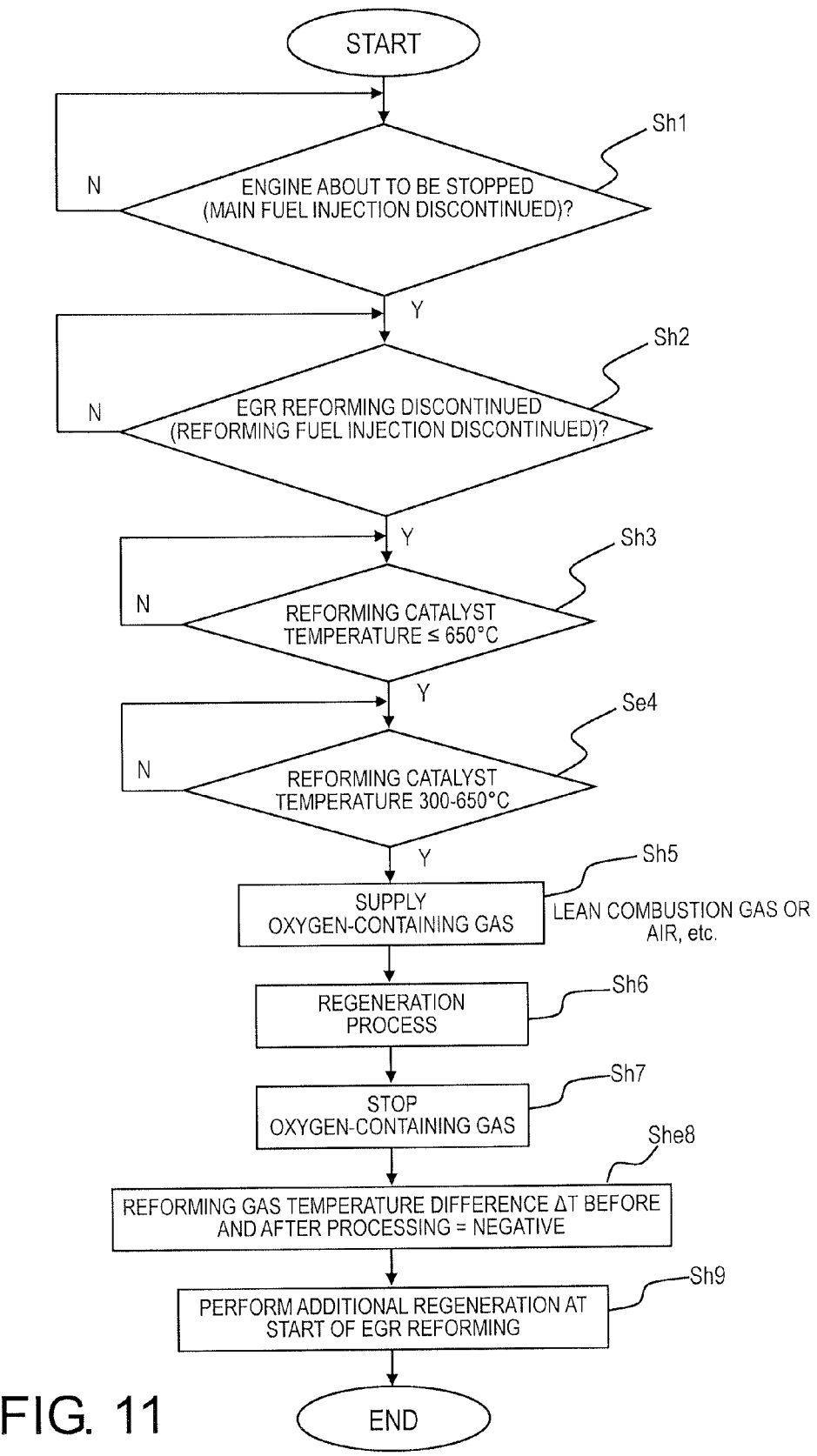
FIG. 11 is a flow chart showing the operation, according to a fifth example, of the internal combustion engine system according to the second embodiment.

FIG. 11 is a flow chart showing the operation, according to a fifth example, of the internal combustion engine system A2. In this example, the controller C has the following functions.

(7) A function for calculating the temperature of the reforming catalyst before and after regeneration. This function is referred to as the "reforming catalyst temperature calculation means C7." In the present embodiment, the temperature of the reforming catalyst before and after regeneration is calculated on the basis of a detection value detected by the reformer catalyst temperature sensor S1.

(8) A function for determining whether or not the difference in the reforming catalyst temperatures before and after regeneration has become negative. This function is referred to as the "reformer catalyst temperature determination means C8." If it is determined that the temperature of the reforming catalyst before and after regeneration has become negative, the reforming catalyst regeneration means regenerates the reforming catalyst at the EGR reforming start time mentioned further above.

Step 1 (indicated by "Sh1" in FIG. 11; similar abbreviations apply below): it is determined whether or not the engine is about to stop. If it is determined that the engine is about to stop, the flow proceeds to step 2, and if not, step 1 is repeated.

Step 2: it is determined whether or not the reforming of the exhaust gas has been discontinued. If it is determined that the reforming of the exhaust gas has been discontinued, the flow proceeds to step 3, and if not, step 2 is repeated. Step 3: it is determined whether or not the temperature of the reforming catalyst has become 650° C. or less. If it is determined that the temperature has become 650° C. or less, the flow proceeds to step 4, and if not, step 3 is repeated.

Step 4: it is determined whether or not the temperature of the reforming catalyst is in a temperature range of 300° C. to 650° C. If it is determined that the temperature is in this temperature range, the flow proceeds to step 5, and if not, step 4 is repeated.

Step 5: the exhaust control valve 19 is closed and the flow of the exhaust gas through the EGR pipe 30 is started. Step 6: the exhaust gas is caused to flow through the EGR pipe 30 at the required temperature, whereby the reforming catalyst is subjected to a regeneration process. Step 7: the exhaust control valve 19 is opened, and the supply of the exhaust gas to the EGR pipe 30 is discontinued.

Step 8: it is determined whether or not the reforming catalyst temperature difference $\Delta T$ before and after processing has become negative. If it is determined that the reforming catalyst temperature difference $\Delta T$ before and after processing has become negative, the flow proceeds to step 9, and if not, the flow proceeds to step 8. Step 9: an additional regeneration process is performed at the EGR reforming start time.

According to the internal combustion engine system A2 described above, the following effects can be obtained.

Providing the oxygen-containing gas supply device 40 makes it possible to perform a regeneration process without being influenced by the state of combustion in the combustion chamber 11. Specifically, the present configuration is effective when regeneration is performed when EGR reforming is discontinued and at the EGR reforming start time.

In addition, providing an oxygen-containing gas supply device 40 makes it possible to control the regeneration processing time in a discretionary manner. In an instance in which regeneration is performed when EGR reforming is discontinued and the reforming catalyst temperature difference $\Delta T$ before and after regeneration does not become negative (i.e., in an instance in which combustion is in progress and regeneration is insufficient), regeneration may be maintained until the reforming catalyst temperature difference $\Delta T$ becomes negative.

According to an internal combustion engine system according to each of the embodiments described above, the following effects can be obtained.

The lifespan of the reforming catalyst can be extended without having to detect a performance decrease/degradation of the reforming catalyst.

The reforming catalyst can be regenerated at appropriate times, making it possible to increase the lifespan of the reforming catalyst by orders of magnitude.

Regeneration is possible without having to provide a means for detecting a performance decrease/degradation of the reforming catalyst, making it possible to simplify the onboard system.

Permanent degradation of the reforming catalyst caused by thermal degradation can be prevented by not performing regeneration of the reforming catalyst if the reforming catalyst has a high temperature.

Regenerating the reforming catalyst during idle stop makes it possible to perform regeneration even under conditions in which the temperature of the reforming catalyst is not very high.

Regenerating the reforming catalyst at the start of EGR reforming makes it possible to perform regeneration over a long period of time from a relatively low temperature.

Regenerating the reforming catalyst by an oxidation reaction using an oxygen-containing gas makes it possible to remove, by oxidation, deposited carbon which is one cause of a decrease in performance.

Using an internal combustion engine lean combustion gas as the oxygen-containing gas employed for regeneration of the reforming catalyst makes it possible to regenerate the reforming catalyst without providing a special oxygen-containing gas supply means.

Supplying the oxygen-containing gas employed for regeneration of the reforming catalyst from the oxygen-containing gas supply device 40 makes it possible to perform regenera tion without being dependent on the state of operation of the internal combustion engine 10.

Regenerating the reforming catalyst when the reforming catalyst temperature is no less than 300° C. and no greater than 600° C. makes it possible to remove deposited carbon by oxidation and prevent permanent degradation of the catalyst caused by thermal degradation.

Preventing the oxygen-containing gas from being supplied during regeneration of the reforming catalyst if the reforming catalyst temperature is equal to or greater than 650° C. makes it possible to prevent permanent degradation of the catalyst caused by thermal degradation during regeneration of the reforming catalyst.

Performing regeneration at the start of EGR reforming in addition to the initial regeneration process if, when the reforming catalyst is initially regenerated, the temperature difference ΔT between the reforming catalyst temperatures before and after the regeneration becomes negative, makes it possible to maintain the performance of the reforming catalyst even if the initial regeneration has not been sufficient.

Regeneration of the reforming catalyst can be performed without providing a device or the like for detecting a performance decrease/degradation of the reforming catalyst as in the past, making it possible to simplify the onboard system.

Not performing the regeneration process when the reforming catalyst temperature is high makes it possible to prevent permanent degradation of the reforming catalyst caused by thermal degradation.

Examples

More specific examples will now be described. In an internal combustion engine system A1 shown in FIG. 1 carrying a rhodium-based catalyst as a reforming catalyst, a regeneration process was performed, when the engine was about to be stopped, according to the procedure shown in the flow chart in FIG. 8. In an instance in which the regeneration process is performed when the engine is about to be stopped, the regeneration process was performed upon confirming also that the EGR reforming has been discontinued, i.e., that no fuel is being supplied to the reforming catalyst. The lifespan of the reforming catalyst improved by more than one order of magnitude compared to an instance in which no regeneration process was performed.

In an internal combustion engine system A2 shown in FIG. 6, air was supplied from the oxygen-containing gas supply device 40, and a regeneration process was performed, when the EGR reforming is discontinued, according to the procedure shown in the flow chart in FIG. 7. The lifespan of the reforming catalyst improved by more than one order of magnitude compared to an instance in which no regeneration process was performed.

In the abovementioned internal combustion engine system A2, a regeneration process was performed combining the regeneration methods shown in FIGS. 7-11. As a result, the lifespan of the reforming catalyst improved by more than two orders of magnitude compared to an instance in which no regeneration process was performed. As described above, according to the internal combustion engine systems A1 and A2 of the present invention, the reforming catalyst can be regenerated at an appropriate time, making it possible to improve the lifespan of the reforming catalyst by several orders of magnitude and improve fuel economy.

While a detailed description was given above, the application of each of the configurations described in each of the above embodiments is not limited to the respective embodiment. A configuration described in one embodiment can be adopted or applied to another embodiment, and a combination of configurations can also be combined in a discretionary manner.

The invention claimed is:

1. An internal combustion engine system comprising
an internal combustion engine in which an exhaust circulation path is connected to an exhaust path and an intake path communicating with a combustion chamber;
a reforming fuel injection device configured to inject a reforming fuel into an exhaust gas flowing through the exhaust circulation path;
a reformer provided with a reforming catalyst configured to generate a hydrogen-containing gas using the reforming fuel; and
a controller including a regeneration timing determination section that is programmed to determine whether or not reforming of the exhaust gas has been discontinued, and a reforming catalyst regeneration section that is programmed to direct an oxygen-containing gas through the exhaust circulation path to regenerate the reforming catalyst upon the regeneration timing determination section determining that the reforming of the exhaust gas has been discontinued,
the regeneration timing determination section determining that the reforming of the exhaust gas has been discontinued by determining whether or not reforming of the exhaust gas flowing through the exhaust circulation path is to be started, and
upon determining that reforming of the exhaust gas flowing through the exhaust circulation path is to be started, the reforming catalyst regeneration section performs regeneration of the reforming catalyst during an EGR reforming start time before injection of the reforming fuel.

2. The internal combustion engine system according to claim 1, wherein
the regeneration timing determination section determines that the reforming of the exhaust gas has been discontinued by determining whether or not the internal combustion engine is about to be stopped, and
upon determining that the internal combustion engine is about to be stopped, the reforming catalyst regeneration section performs regeneration of the reforming catalyst.

3. The internal combustion engine system according to claim 1, wherein
the regeneration timing determination section determines that the reforming of the exhaust gas has been discontinued by determining whether or not idle stop is in effect, and
upon determining that idle stop is in effect, the reforming catalyst regeneration section performs regeneration of the reforming catalyst.

4. The internal combustion engine system according to claim 1, wherein
the reforming catalyst regeneration section performs the reforming of the reforming catalyst by an oxidation reaction using the oxygen-containing gas.

5. The internal combustion engine system according to claim 4, wherein
the reforming catalyst regeneration section is configured to supply an internal combustion engine lean combustion gas as the oxygen-containing gas.

6. The internal combustion engine system according to claim 1, wherein
an oxygen-containing gas supply device is provided to the exhaust circulation path; and the oxygen-containing gas is supplied using the oxygen-containing gas supply device.

7. The internal combustion engine system according to claim 1, wherein
the reforming catalyst regeneration section is configured to perform the reforming of the reforming catalyst upon determining that the reforming catalyst is at a temperature no less than 300° C. and no greater than 600° C.

8. An internal combustion engine system comprising
an internal combustion engine in which an exhaust circulation path is connected to an exhaust path and an intake path communicating with a combustion chamber;
a reforming fuel injection device configured to inject a reforming fuel into an exhaust gas flowing through the exhaust circulation path;
a reformer provided with a reforming catalyst configured to generate a hydrogen-containing gas using the reforming fuel; and
a controller including a regeneration timing determination section that is programmed to determine whether or not reforming of the exhaust gas has been discontinued, and a reforming catalyst regeneration section that is programmed to direct an oxygen-containing gas through the exhaust circulation path to regenerate the reforming catalyst upon the regeneration timing determination section determining that the reforming of the exhaust gas has been discontinued,
the controller further including a reformer catalyst temperature determination section that is programmed to determine whether or not the temperature of the reforming catalyst provided to the reformer has become 650° C. or above; and
the controller further includes an oxygen-containing gas supply discontinuation section that is programmed to discontinue the supply of the oxygen-containing gas when the temperature of the reforming catalyst is determined to have become 650° C. or above.

9. An internal combustion engine system comprising
an internal combustion engine in which an exhaust circulation path is connected to an exhaust path and an intake path communicating with a combustion chamber;
a reforming fuel injection device configured to inject a reforming fuel into an exhaust gas flowing through the exhaust circulation path;
a reformer provided with a reforming catalyst configured to generate a hydrogen-containing gas using the reforming fuel;
a controller including a regeneration timing determination section that is programmed to determine whether or not reforming of the exhaust gas has been discontinued, and a reforming catalyst regeneration section that is programmed to direct an oxygen-containing gas through the exhaust circulation path to regenerate the reforming catalyst upon the regeneration timing determination section determining that the reforming of the exhaust gas has been discontinued,
the controller further includes a reforming catalyst temperature calculation section for calculating the temperature of the reforming catalyst before and after regeneration; and
the controller further includes a reformer catalyst temperature determination section that is programmed to determine whether or not a temperature difference in the temperatures of the reforming catalyst before and after reforming has become negative, and
upon determining that the temperature difference in the temperatures of the reforming catalyst before and after reforming has become negative, regeneration of the reforming catalyst is performed when reforming of the recirculating exhaust gas using the reforming catalyst is started.

10. The internal combustion engine system according to claim 2, wherein
the regeneration timing determination section determines whether or not idle stop is in effect, and upon it being determined that idle stop is in effect, the reforming catalyst regeneration means performs regeneration of the reforming catalyst.

11. The internal combustion engine system according to claim 2, wherein
the regeneration timing determination section determines that the reforming of the exhaust gas has been discontinued by determining whether or not reforming of the exhaust gas flowing through the exhaust circulation path is to be started, and
upon determining that reforming of the exhaust gas flowing through the exhaust circulation path is to be started, the reforming catalyst regeneration section performs regeneration of the reforming catalyst during an EGR reforming start time before injection of the reforming fuel.

12. The internal combustion engine system according to claim 2, wherein
the reforming catalyst regeneration section performs the reforming of the reforming catalyst by an oxidation reaction using the oxygen-containing gas.

13. The internal combustion engine system according to claim 12, wherein
the reforming catalyst regeneration section is configured to supply an internal combustion engine lean combustion gas as the oxygen-containing gas.

14. The internal combustion engine system according to claim 2, wherein
an oxygen-containing gas supply device is provided to the exhaust circulation path; and
the oxygen-containing gas is supplied using the oxygen-containing gas supply device.

15. The internal combustion engine system according to claim 2, wherein
the reforming catalyst regeneration section is configured to perform the reforming of the reforming catalyst upon determining that the reforming catalyst is at a temperature no less than 300° C. and no greater than 600° C.

16. The internal combustion engine system according to claim 2, wherein
the controller further includes a reformer catalyst temperature determination section that is programmed to determine whether or not the temperature of the reforming catalyst provided to the reformer has become 650° C. or above; and
the controller further includes an oxygen-containing gas supply discontinuation section that is programmed to discontinue the supply of the oxygen-containing gas when the temperature of the reforming catalyst is determined to have become 650° C. or above.

17. The internal combustion engine system according to claim 2, wherein
the controller further includes a reforming catalyst temperature calculation section for calculating the temperature of the reforming catalyst before and after regeneration; and
the controller further includes a reformer catalyst temperature determination section that is programmed to determine whether or not a temperature difference in the temperatures of the reforming catalyst before and after reforming has become negative, and upon determining that the temperature difference in the temperatures of the reforming catalyst before and after reforming has become negative, regeneration of the reforming catalyst is performed when reforming of the recirculating exhaust gas using the reforming catalyst is started.

\* \* \* \* \*